June 27, 1944.    G. LEE    2,352,330
FILTER AND AUTOMATIC VALVE
Filed July 2, 1940
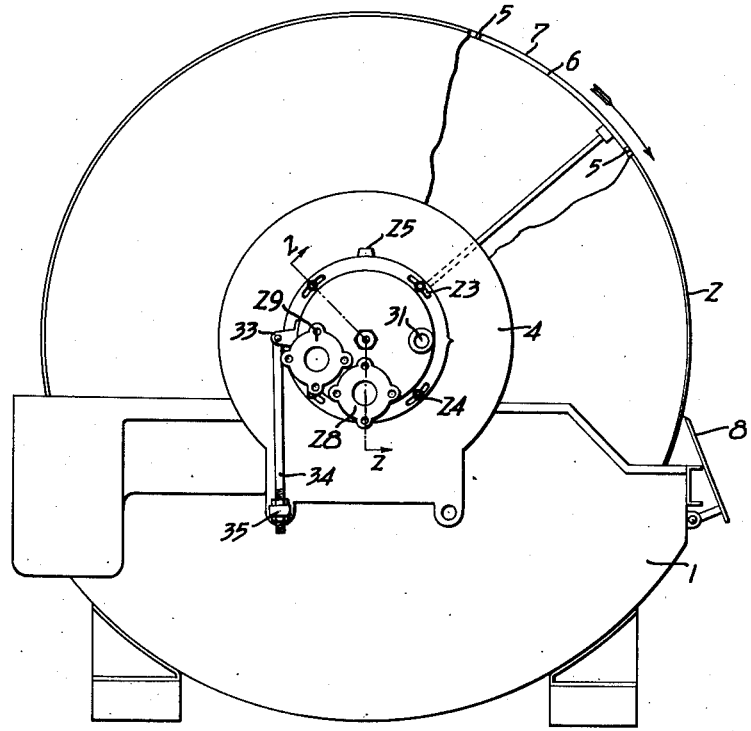
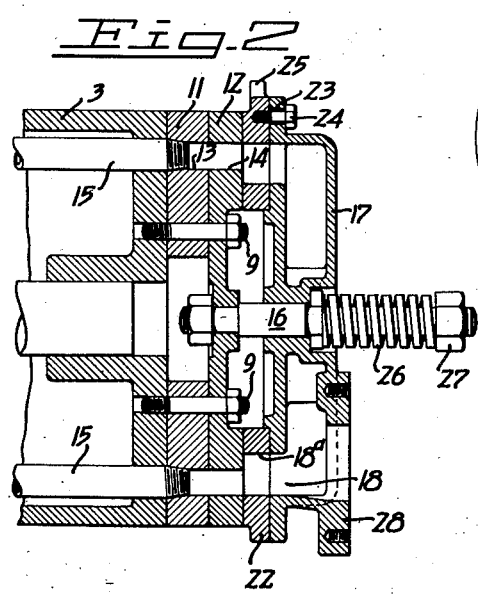
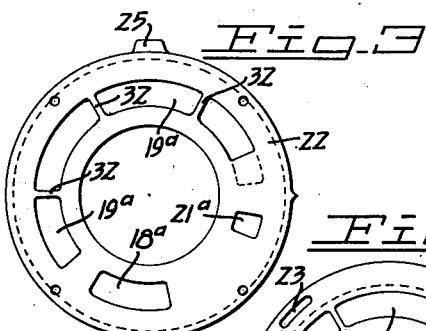
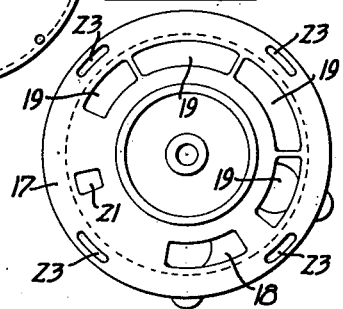
INVENTOR
GRAHAM LEE
BY
ATTORNEY Patented June 27, 1944

2,352,330

UNITED STATES PATENT OFFICE 2,352,330

FILTER AND AUTOMATIC VALVE

Graham Lee, Oakland, Calif., assignor to Oliver United Filters Incorporated, Oakland, Calif., a corporation of Nevada Application July 2, 1940, Serial No. 343,580

5 Claims. (Cl. 210—199)

This invention relates in general to an automatic valve and in particular to an automatic valve for continuous rotary filters by which the cycle of operation may be adjusted within limits without dismantling the valve.

A continuous rotary filter normally comprises either a sectionalized rotary drum or a sectionalized rotary disc arranged to rotate through a body of the material to be filtered.

The cycle of operation normally includes a pick-up period, a wash period, and a discharge period. The pick-up and wash periods are carried out under the influence of an inwardly directed differential pressure, whereas the discharge is effected by means of a blow back or reverse pressure. Since the initial filtrate will sometimes be cloudy, it is advisable to effect a separation between the cloudy and clear filtrates. When a displacement wash is applied to the cake carried on the unsubmerged sections of the filter, the wash water passing through as filtrate may be picked up as part of the clear filtrate. All of these operations are normally carried out by means of what is generally known as an automatic valve, consisting of a wear plate carried on the end of one of the trunnions supporting the filter sections and a stationary valve body disposed over the wear plate. The wear plate is provided with a plurality of openings, each communicating with one of the filter sections, and the valve body is provided with a number of ports adapted to register with the openings in the wear plate. One or more of the ports of the valve body communicate with any suitable source of vacuum such as a vacuum receiver, while one of them communicates with a source of pressure for effecting the discharge of the cake carried on the filter sections.

Frequently it is desirable to adjust the valve so that the cycle of operation may be varied with respect to the time at which any of the various operations carried out on the filter are effected. In the past this has been done by the use of so-called "adjustable bridges" disposed within the valve body, but this is objectionable for the reason that in moving the valve body the connections between the valve body and the conduits communicating with the vacuum receivers are apt to be impaired. Another scheme which has been resorted to is to use an adjustable bridge actuated externally through a rack and pinion or set of gears, and while for certain operations the use of such an expedient has proved satisfactory, the cost is somewhat excessive.

The object of this invention is the provision of an automatic valve wherein there is interposed between the wear plate and the valve body a bridge plate formed with openings or ports substantially corresponding to the openings or ports of the valve body, and so arranging the bridge plate that it may be subjected to a limited angular movement with respect to the stationary valve body.

The invention possesses other advantageous features, some of which with the foregoing will be set forth at length in the following description where that form of the invention which has been selected for illustration in the drawing accompanying and forming a part of the present specification is outlined in full. In said drawing, one form of the invention is shown, but it is to be understood that it is not limited to such form, since the invention as set forth in the claims may be embodied in a plurality of forms.

Referring to the drawing:

Figure 1 is an end elevation of a rotary drum filter embodying the objects of my invention.

Figure 2 is a partial section taken on the line 2—2 of Figure 1.

Figure 3 is an end elevation of the outer face of the bridge plate shown in Figure 2.

Figure 4 is an end elevation of the inner face of the valve body as shown in Figure 2.

As shown in Figure 1, the adjustable valve here described has been applied to a conventional rotary drum filter comprising a pulp or slurry tank 1 within which is arranged to rotate a rotary drum 2 carried at each end by trunnions 3 journaled in suitable bearings, not shown, supported on the ends of the tank 1. Rotation of the drum is imparted by means of a driven gear carried by one of the trunnions 3 and disposed in the gear housing 4. Formed on the periphery of the drum by longitudinally extending, peripherally spaced division strips 5, are a plurality of filtrate compartments or sections 6, the outer surface of which is defined by a cover of filter medium 7.

Secured to the tank 1 on the descending side of the drum 2 is a doctor or scraper 8 by which the cake formed and carried by the drum is discharged.

Detachably secured to the end of one of the trunnions 3 by bolts 9 are a pipe plate 11 and a wear plate 12, each provided with a plurality of registering openings 13 and 14 arranged in a circle about the axis of the trunnion. Communication between each of the filtrate compartments 6 and the openings 13 and 14, respectively, of the pipe plate 11 and wear plate 12, is established by filtrate pipes 15. Secured to the wear plate 12 is a central pin 16 which supports a valve body 17. The valve body 17 is formed with a plurality of ports 18, 19, and 21, the first for the reception of cloudy filtrate, the second for the reception of clear filtrate, wash water, and air, and the third for the introduction of a reverse pressure or blow back for discharging the cake formed on the filter medium. Disposed between the valve body and the wear plate 12 is a bridge plate 22, the surfaces of which are ground so as to register accurately with the ground surfaces of the wear plate 12 and the valve body 17. Formed in the bridge plate 22 are a plurality of apertures 18ᵃ, 19ᵃ, and 21ᵃ corresponding with the ports 18, 19, and 21 of the valve body 17. The valve body 17 is provided on its periphery with a plurality of slots 23 for the reception of machined screws 24 threaded to the bridge plate 22. By means of these slots limited angular movement between the bridge plate and the valve body is permitted, and to enable the bridge plate to be moved within these limits, it is provided with a lug 25. Ordinarily the movement of the bridge plate is established by striking the lug 25 with a lead hammer.

Disposed over the outer end of the pin 16 is a compression spring 26 held under compression by a nut 27 carried on the end of the pin, so that the bridge plate 22 and the valve body 17 are resiliently held in engagement with each other and with the wear plate 12.

Formed on the outer surface of the valve body 17 are fittings 28 and 29 to which vacuum lines may be secured, and a fitting 31 to which a pressure line may be secured.

Since the aperture 19ᵃ formed in the bridge plate 22 extends over a considerable arc, the bridge plate would be weakened and subject to warpage unless reinforced, and for this reason when being cast it is cored so as to provide relatively thin reinforcing members 32. It is to be particularly noted that these reinforcing members are substantially thinner than the openings 14 formed in the wear plate 12. Consequently the openings 14 in passing over the reinforcing members 32 are by no means blanked off.

For the purpose of rotating the valve body within small limits, it is provided with a lug 33 to which is pivoted a rod 34, the outer end of the rod 34 being adjustably secured to a lug or ear 35 extending from the end of the tank 1.

From the above description it will be noted that the apertures 18ᵃ, 19ᵃ and 21ᵃ may be placed in absolute registration with the corresponding ports 18, 19, and 21 of the valve body 17 or substantially out of registration therewith by simply effecting a relative movement of these two members by means of the lug 25. This construction therefore affords a very simple and effective means of adjusting the cycle of operation of the filter with which a valve of this type is associated, without the necessity of either removing the valve body or using gears.

I claim:

1. A valve comprising: a rotary plate arranged for rotation about a predetermined axis and formed with a non-central opening; a bridge plate disposed over said rotary plate and formed with an aperture substantially larger than said non-central opening and with which said non-central opening is adapted to register during the rotation of said rotary plate; a non-rotatable valve body disposed over said bridge plate and formed with a port substantially larger than said non-central opening and with which said aperture is adapted to register, said bridge plate being arranged for limited angular movement with respect to said valve body, so that the degree of registration between the aperture and the bridge plate and the port of the valve body can be adjusted; means for detachably securing said bridge plate to said valve body so that normally there will be no relative movement between them; and means for holding said rotary plate, bridge plate and valve body respectively in operative face to face relation with each other.

2. A valve comprising: a rotary plate arranged for rotation about a predetermined axis and formed with a plurality of openings located in a circle concentric with said axis; a bridge plate disposed over said rotary plate and formed with an aperture substantially larger than any one of said openings and with which said openings are adapted to register during the rotation of said rotary plate; a non-rotatable valve body disposed over said bridge plate and formed with a port substantially larger than any one of said openings and with which said aperture is adapted to register, said bridge plate being arranged for limited angular movement with respect to said valve body so that the degree of registration between the aperture of the bridge plate and the port of the valve body can be adjusted; means for detachably securing said bridge plate to said valve body so that normally there will be no relative movement between them; and means for holding said rotary plate, bridge plate and valve body respectively in operative face to face relation with respect to each other.

3. A valve comprising: a rotary plate arranged for rotation about a predetermined axis and formed with an opening spaced from said axis; a bridge plate disposed over said rotary plate and formed with a plurality of apertures substantially larger than said opening and with which said opening is adapted to successively register during the rotation of said rotary plate; a non-rotatable valve body disposed over said bridge plate and formed with a plurality of ports complementary to and substantially of the same size and shape as the apertures of the bridge plate and with which said ports are adapted successively to register, said bridge plate being arranged for limited angular movement with respect to said valve body so that the degree of registration between the apertures of the bridge plate and the ports of the valve body can be adjusted; means for detachably securing said bridge plate to said valve body so that normally there will be no relative movement between them; and means for holding said rotary plate, bridge plate and valve body respectively in operative face to face relation with respect to each other.

4. A filter comprising: a filter cell arranged to rotate in a closed path through a body of the material to be filtered; a rotary plate arranged for rotation about a predetermined axis in response to the rotation of said filter cell and formed with an opening communicating with said filter cell; a bridge plate disposed over said rotary plate and formed with an aperture with which said opening is adapted to register during the rotation of said rotary plate; a non-rotatable valve body disposed over said bridge plate and formed with a port with which said aperture is adapted to register, said bridge plate being arranged for limited angular movement with respect to said valve body so that the degree of registration between the aperture of the bridge plate and the port of the valve can be adjusted; means for detachably securing said bridge plate to said valve body so that normally there will be no relative movement between them; and means for holding said rotary plate, bridge plate and valve body respectively in operative face to face relation with respect to each other.

5. A filter comprising: a filter cell arranged to travel in a closed path through a body of the material to be filtered; a trunnion on which said cell is carried; a wear plate detachably secured to the end of said trunnion and formed with an opening in communication with said filter cell; a valve body carried by a pin secured to said wear plate along the axis of said trunnion; a bridge plate disposed between and arranged to seat against the opposed faces of said wear plate and valve body; an aperture formed in said bridge plate with which the opening in said wear plate is arranged to register periodically during the rotation of said trunnion; a port formed in said valve body with which the aperture in said bridge plate is adapted to register; means for permitting a limited angular movement of said bridge plate with respect to said valve body so as to vary the degree of registration of its said aperture with the valve body port; resilient means for maintaining the valve body in engagement with the bridge plate and the bridge plate in engagement with the wear plate; and means for detachably securing said bridge plate to said valve body so that normally there will be no relative movement between them.

GRAHAM LEE.